US008980455B2

(12) United States Patent
Guo (10) Patent No.: US 8,980,455 B2
(45) Date of Patent: Mar. 17, 2015

(54) LITHIUM-ION BATTERY WITH A GAS-RELEASING AND EXPLOSION-PROOF SAFETY VALVE

(75) Inventor: Zhi Guo, Yuyao (CN)

(73) Assignee: Zhejiang University, Hangzhou, Zhejiang Province (CN)

( * ) Notice: Subject to any disclaimer, the term of this patent is extended or adjusted under 35 U.S.C. 154(b) by 150 days.

(21) Appl. No.: 13/578,991

(22) PCT Filed: Aug. 11, 2010

(86) PCT No.: PCT/CN2010/075901
§ 371 (c)(1),
(2), (4) Date: Aug. 14, 2012

(87) PCT Pub. No.: WO2011/140751
PCT Pub. Date: Nov. 17, 2011

(65) Prior Publication Data
US 2012/0315514 A1    Dec. 13, 2012

(30) Foreign Application Priority Data

May 12, 2010  (CN) .......................... 2010 1 0171087
Aug. 11, 2010  (WO) ................ PCT/CN2010/075901

(51) Int. Cl.
*H01M 2/12*     (2006.01)
*H01M 2/04*     (2006.01)
*H01M 10/0525*  (2010.01)

(52) U.S. Cl.
CPC ............ *H01M 2/043* (2013.01); *H01M 2/1229* (2013.01); *H01M 2/1276* (2013.01); *H01M 10/0525* (2013.01); *Y02E 60/122* (2013.01); *H01M 2200/20* (2013.01)
USPC .......................................................... 429/53

(58) Field of Classification Search
CPC ....... H01M 2/12; H01M 2/02; H01M 2/0257; H01M 2/04; H01M 2/043; H01M 2/0439; H01M 2/0482; H01M 2/0486; H01M 2/0285; H01M 2/0277; H01M 2/342; H01M 2/30; H01M 2/1264
See application file for complete search history.

(56) References Cited

U.S. PATENT DOCUMENTS

| 4,072,799 | A  | * | 2/1978  | Leeson et al. ................. 429/82 |
| 5,486,429 | A  | * | 1/1996  | Thibault ...................... 429/403 |
| 5,830,594 | A  | * | 11/1998 | Malay ............................ 429/53 |
| 6,255,013 | B1 | * | 7/2001  | Marukawa et al. ............ 429/82 |
| 2001/0049051 | A1 | * | 12/2001 | Jones et al. .................... 429/86 |
| 2003/0039882 | A1 | * | 2/2003  | Wruck et al. ................. 429/121 |
| 2003/0059669 | A1 | * | 3/2003  | Mittal et al. ................... 429/82 |

(Continued)

*Primary Examiner* — Ula C. Ruddock
*Assistant Examiner* — Scott J Chmielecki
(74) *Attorney, Agent, or Firm* — Han IP Corporation (57) ABSTRACT

The present disclose provides a lithium-ion battery with a gas-releasing and explosion-proof safety valve, which comprises a casing and a battery core. The casing includes an opening that is sealed by a thermal cover, on which a safety valve is disposed. The safety valve comprises a safety cover and a pressure filter. A middle portion of the safety cover includes a through hole. The pressure filter is affixed to the middle portion of the safety cover and has numerous pores. The safety cover and thermal cover are hooked together. The present invention offers multiple advantages. Firstly, simplified structure without aging issue enhances the safety and reliability of the battery. Secondly, during operation, gas is ventilated when an internal pressure of the battery reaches a certain threshold value to avoid rupture of the battery casing. Thirdly, with enhanced performance of the battery, the cycle life of the battery is greatly increased.

18 Claims, 11 Drawing Sheets

(56) References Cited

U.S. PATENT DOCUMENTS

| | | |
|---|---|---|
| 2003/0215708 A1* | 11/2003 | Vine .......................... 429/176 |
| 2008/0003493 A1* | 1/2008 | Bates .......................... 429/66 |
| 2010/0021811 A1* | 1/2010 | Kado et al. ................. 429/185 |
| 2010/0173178 A1* | 7/2010 | Kim et al. ..................... 429/1 |

\* cited by examiner

LITHIUM-ION BATTERY WITH A GAS-RELEASING AND EXPLOSION-PROOF SAFETY VALVE

CROSS-REFERENCE TO RELATED APPLICATION

This application is the national phase application of International application number PCT/CN2010/075901, filed Aug. 11, 2010, which claims the priority benefit of China Patent Application No. 201010171087.0, filed May 12, 2010. The above-identified applications are hereby incorporated by reference in their entirety.

TECHNICAL FIELD

The present invention pertains to the technical field of manufacturing of batteries for electric cars, especially a type of lithium-ion battery with a gas release and explosion-proof safety valve.

BACKGROUND

As well known, electric cars are a type of energy-efficient and fast transportation, and have been gaining popularity among the general public. Electric cars are also a type of green transportation. As environmental awareness increases at various levels of the society, the usage of electric cars becomes more and more popular while the electric car industry has strong support from the community, including the government.

Battery is the "heart" of an electric car as the battery performance has a direct impact on the performance and quality of the electric car. Thus, an electric car's battery plays a very important role regarding the electric car. With respect to the battery itself, safety is a very important safety indicator.

The structure of a battery typically includes a safety valve disposed in the middle portion of an upper cover. Basic components of the safety valve include an aluminum gasket, a spring and a safety release. The safety release includes at least one orifice on its top side. The bottom side of the safety release (inside the casing of the battery) is connected with the aluminum gasket through the spring. During the manufacturing process of the battery, the battery is filled with a liquid electrolyte through an opening on the upper cover where the safety valve is located. After filling the battery with the liquid electrolyte, the aluminum gasket, the spring and the safety release are sequentially installed on the opening. When installed, the aluminum gasket and the spring seal up the opening. Under normal operating conditions, there is no gas inside the battery casing. Further, external gas and moisture cannot enter into the battery due to the spring-loaded aluminum gasket. When gas forms inside the battery as a result of electrolysis, the spring is compressed under pressure and protrudes upwardly, as the spring has a certain elastic modulus, and moves the aluminum gasket upwardly. A certain ventilation gap is formed as a result of the movement of the aluminum gasket, thus allowing the internal gas to pass through the gap and be ventilated out of the battery through the orifice of the safety release.

There are a number of issues associated with the above-described safety valve structure. Firstly, as the spring and the aluminum gasket age after a long period of operation, external gas and moisture can easily enter into the battery. The aging of the spring and the aluminum gasket may also result in the internally-formed gas not being timely ventilated out of the battery. This results in increased internal pressure that may cause the battery casing to rupture. Undesirably there is a risk of explosion of the battery at such time. Secondly, externally-installed safety valves of this type tend to have complex structure that require more complex process, time and cost for manufacturing.

SUMMARY

The present invention discloses a lithium-ion battery with a gas-releasing and explosion-proof safety valve that resolves the technical issues of undesirable safety, complex structure and short useful life associated with existing lithium-ion batteries presently used in electric cars.

To address the aforementioned technical issues, the present invention adopts a technical solution as follows: a lithium-ion battery with a gas-releasing and explosion-proof safety valve that comprises a casing and a battery core disposed inside the casing. The casing may be made of a plastic material or a metallic material. The casing includes an opening that is sealed by a thermal cover, on which a safety valve is disposed. The safety valve comprises a safety cover and a pressure filter. A middle portion of the safety cover includes a through hole. The pressure filter is affixed to the middle portion of the safety cover and has numerous pores. The safety cover and thermal cover are hooked together.

According to one aspect, a lithium-ion battery with a gas-releasing and explosion-proof safety valve may comprise: a casing that includes an opening; a battery core disposed inside the casing; a thermal cover that seals the opening of the casing; and a safety valve disposed on the thermal cover. The safety valve may comprise a safety cover and a pressure filter. A middle portion of the safety cover may include a through hole therein. The safety cover and the thermal cover may be hooked together. The pressure filter may be affixed on the middle portion of the safety cover and having a plurality of pores.

In one embodiment, in the lithium-ion battery with a gas-releasing and explosion-proof safety valve and with respect to a cross section of the thermal cover, a middle portion of the thermal cover may extend towards an inside of the casing to form a first section, and extend horizontally towards a middle portion thereof to form a second section, then extend upwardly to form a third section. A gap may exist between the third section and the first section. A rim may be formed around an outer circumference of the third section with a hook surface facing downward such that the hook surface of the rim around the third section and a hook surface of a rim around the thermal cover hook together.

In one embodiment, the lithium-ion battery with a gas-releasing and explosion-proof safety valve may further comprise a gasket. The safety cover may include a protruding ring that extends inwardly around a lower-middle portion of an inner wall of the safety cover to form a round hole, the protruding ring having an upwardly protruding upper ring and a downwardly protruding lower ring. A gap may exist between the upper ring and a side wall of the thermal cover. A gap may exist between the lower ring and the side wall of the thermal cover. The lower ring and the side wall of the safety cover may fit around the third section of the thermal cover. The hook surface of the rim around the safety cover and the hook surface of the rim around the thermal cover may hook together. The gasket may be disposed between a top surface of the third section of the thermal cover and the protruding ring of the safety cover. An upper opening of the upper ring may be sealed by a first pressure cap. A portion of the first pressure cap that corresponds to the upper opening of the upper ring of the safety cover may include a plurality of pores.

In one embodiment, in the lithium-ion battery with a gas-releasing and explosion-proof safety valve, an upper-middle portion of an inner wall of the safety cover may include a step thereon. The pressure filter may be affixed on or otherwise engaged with the step.

In one embodiment, the lithium-ion battery with a gas-releasing and explosion-proof safety valve may further comprise a second pressure cap that includes a through hole in a middle portion thereof and a gasket. The safety cover may include a rim around the upper end of the safety cover with a second hook surface facing downward. An outer edge of the second pressure cap may bend downwardly to form a downwardly-bending portion with a rim formed around an inner wall of the downwardly-bending portion having a hook surface facing upward. The hook surface of the pressure cap and the second hook surface of the safety cover may hook together. The pressure cap may cover an upper opening of the safety cover and is hooked thereto. The inner wall of the safety cover may include a second step thereon. The gasket may be disposed between the second pressure cap and the second step on the inner wall of the safety cover.

In one embodiment, the lithium-ion battery with a gas-releasing and explosion-proof safety valve may further comprise a second pressure cap that includes a through hole in a middle portion thereof. A lower surface of the second pressure cap may include an annular rib thereon with a triangular cross section. The inner wall of the safety cover may include a second step thereon. The second step of the safety cover may form an annular groove with a triangular cross section. When the pressure cap is mounted on the second step of the safety cover, the annular rib on the pressure cap may mate with and be received in the annular groove of the second step.

In one embodiment, in the lithium-ion battery with a gas-releasing and explosion-proof safety valve, the casing may have a generally rectangular shape.

In one embodiment, in the lithium-ion battery with a gas-releasing and explosion-proof safety valve, the casing may include a first opening and a second opening opposite to the first opening.

In one embodiment, in the lithium-ion battery with a gas-releasing and explosion-proof safety valve, the thermal cover may comprise an aluminum cover.

In one embodiment, the lithium-ion battery with a gas-releasing and explosion-proof safety valve may further comprise a plastic cover that is disposed on an opening of the casing. An outer surface of the plastic cover and the aluminum cover may be in contact.

In one embodiment, the lithium-ion battery with a gas-releasing and explosion-proof safety valve may further comprise an O-ring disposed between the plastic cover and the aluminum cover.

In one embodiment, the lithium-ion battery with a gas-releasing and explosion-proof safety valve may further comprise an aluminum electrode pole and an electrode pole gasket. The aluminum electrode pole may be disposed next to respective inner walls of the plastic cover and the aluminum cover near the casing. The electrode pole gasket may be disposed between the aluminum electrode pole and the plastic cover and the aluminum cover.

In one embodiment, the lithium-ion battery with a gas-releasing and explosion-proof safety valve may further comprise a hex nut and a polarity distinction cover. The hex nut and the polarity distinction cover, in an order, may be screwed onto a portion of the aluminum electrode pole that extends outside of the aluminum cover.

In one embodiment, the lithium-ion battery with a gas-releasing and explosion-proof safety valve may further comprise a second pressure cap that includes a through hole in a middle portion thereof. A lower surface of the second pressure cap may include an annular rib thereon with a triangular cross section. An inner wall of the safety cover may include a second step thereon. The second step of the safety cover may form an annular groove with a triangular cross section. When the pressure cap is mounted on the second step of the safety cover, the annular rib on the pressure cap may mate with and be received in the annular groove of the second step.

In one embodiment, in the lithium-ion battery with a gas-releasing and explosion-proof safety valve, exterior walls on four sides of the casing may include a plurality of parallel reinforcement ribs in a horizontal direction.

In one embodiment, the lithium-ion battery with a gas-releasing and explosion-proof safety valve may further comprise a transparent cover that covers an opening of the casing.

In one embodiment, in the lithium-ion battery with a gas-releasing and explosion-proof safety valve, the transparent cover may snap onto the casing.

In one embodiment, in the lithium-ion battery with a gas-releasing and explosion-proof safety valve, the casing may be made of a plastic material or a metallic material.

Thus, structural improvement and innovation are provided in a lithium-ion battery according to embodiments of the present invention. The safety valve has gas-releasing and explosion-proof functions. In comparison with existing technologies, there are a number of advantageous associated with the present invention. Firstly, the elimination of components such as safety release, spring and aluminum gasket of existing design simplifies the structure and rids of component aging problem, thereby increases the useful life and enhances the safety and reliability during operation. Secondly, during operation of the battery, the safety valve is sprung open when an internal pressure of the battery reaches a certain threshold value to timely ventilate a gas therein to avoid rupture of the battery casing. Safety of the battery is thus enhanced, and reliability of safe operation of the battery during operation is guaranteed. Environmental protection, safety and reliability are addressed. Thirdly, pressure value of the safety vale can be adjusted by adjusting the thickness of adjustable pressure cap. Accordingly, the safety valve can be controlled corresponding to different applications of the battery to timely ventilate internally-formed gas out of the battery. This greatly enhances the safety during operation of the battery, and greatly increases the cycle life of the battery.

DETAILED DESCRIPTION OF SAMPLE EMBODIMENTS

Detailed description of various embodiments of the present invention is provided below with reference to the figures.

First Embodiment

In FIG. 1-7, which pertain to the first embodiment of the present invention, a relationship between numeral references and various components is as follows: 1—pressure cap, 2—pressure filter, 3—gasket, 4—adjustable pressure cap, 5—safety cover, 6—gasket, 7—transparent cover, 8—thermal cover, 9—casing, 10—aluminum electrode poles, 11—electrode pieces, 12—membranes, 13—tapes.

Figure 1:
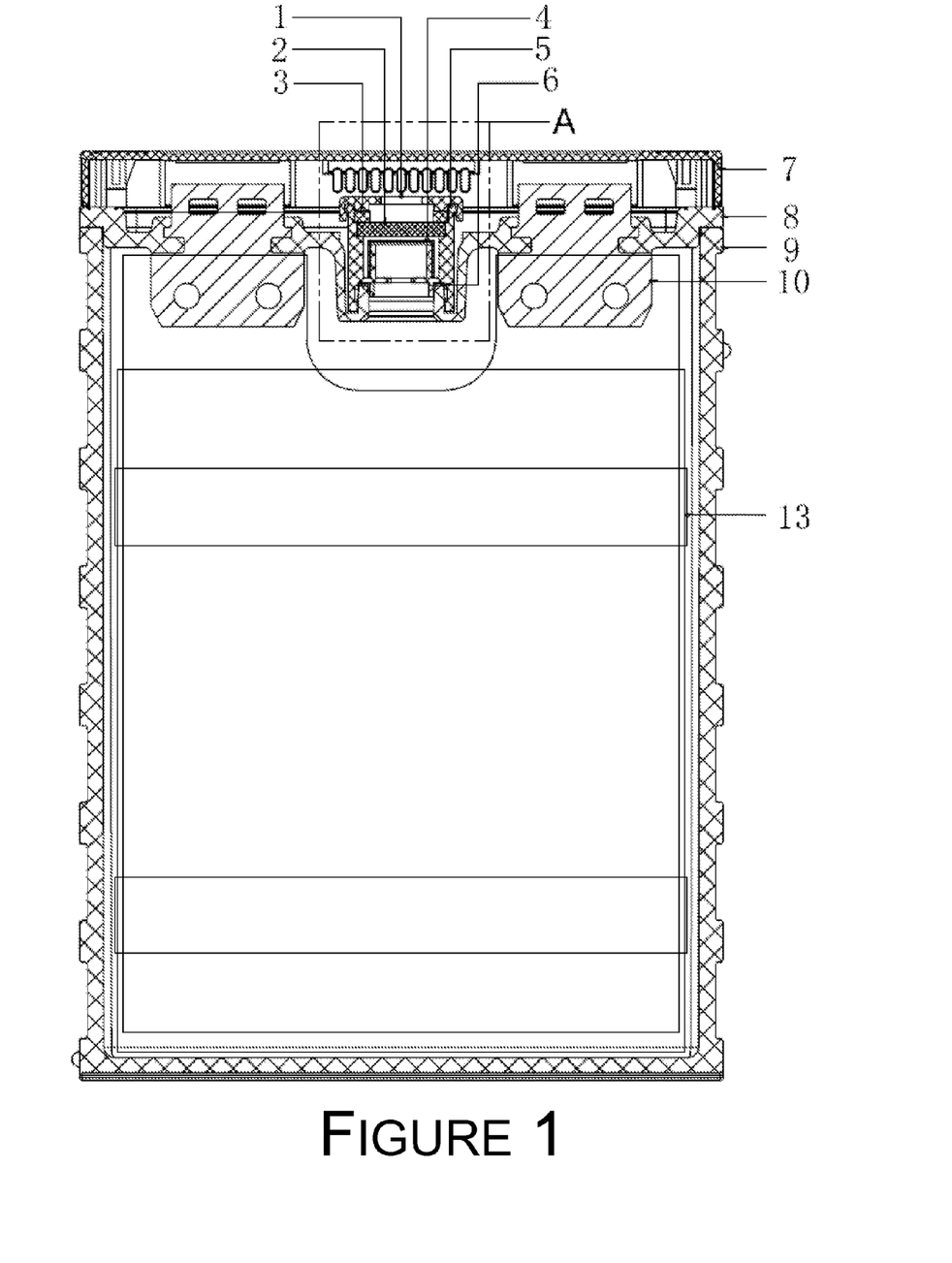
FIG. 1 is a structural diagram of a first embodiment of the present invention.

The first embodiment comprises a lithium-ion battery with electrode poles exposed on one end. The battery includes casing 9 and a battery core that is disposed inside casing 9. Casing 9 is generally rectangular in shape, and is made of a plastic material or a metallic material. A plurality of parallel reinforcement ribs are formed on exterior walls on four sides of casing 9 in a horizontal direction. An opening of casing 9 is sealed by thermal cover 8. Each of a pair of aluminum electrode poles 10 is disposed on a respective side of two sides of thermal cover 8 in symmetry.

Figure 2:
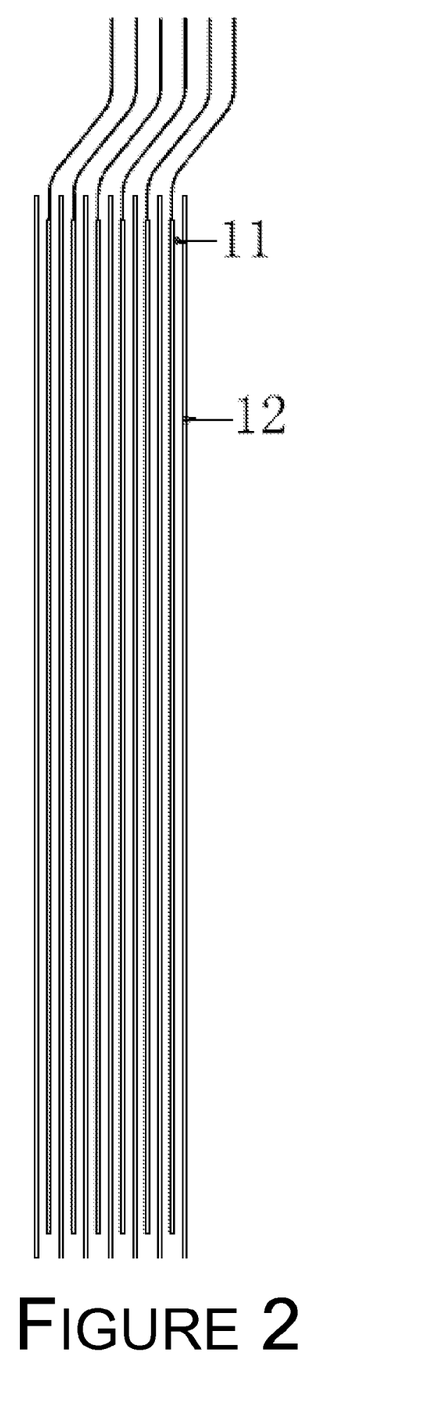
FIG. 2 is a diagram of an arrangement of electrodes and membranes of the first embodiment of the present invention.
Figure 3:
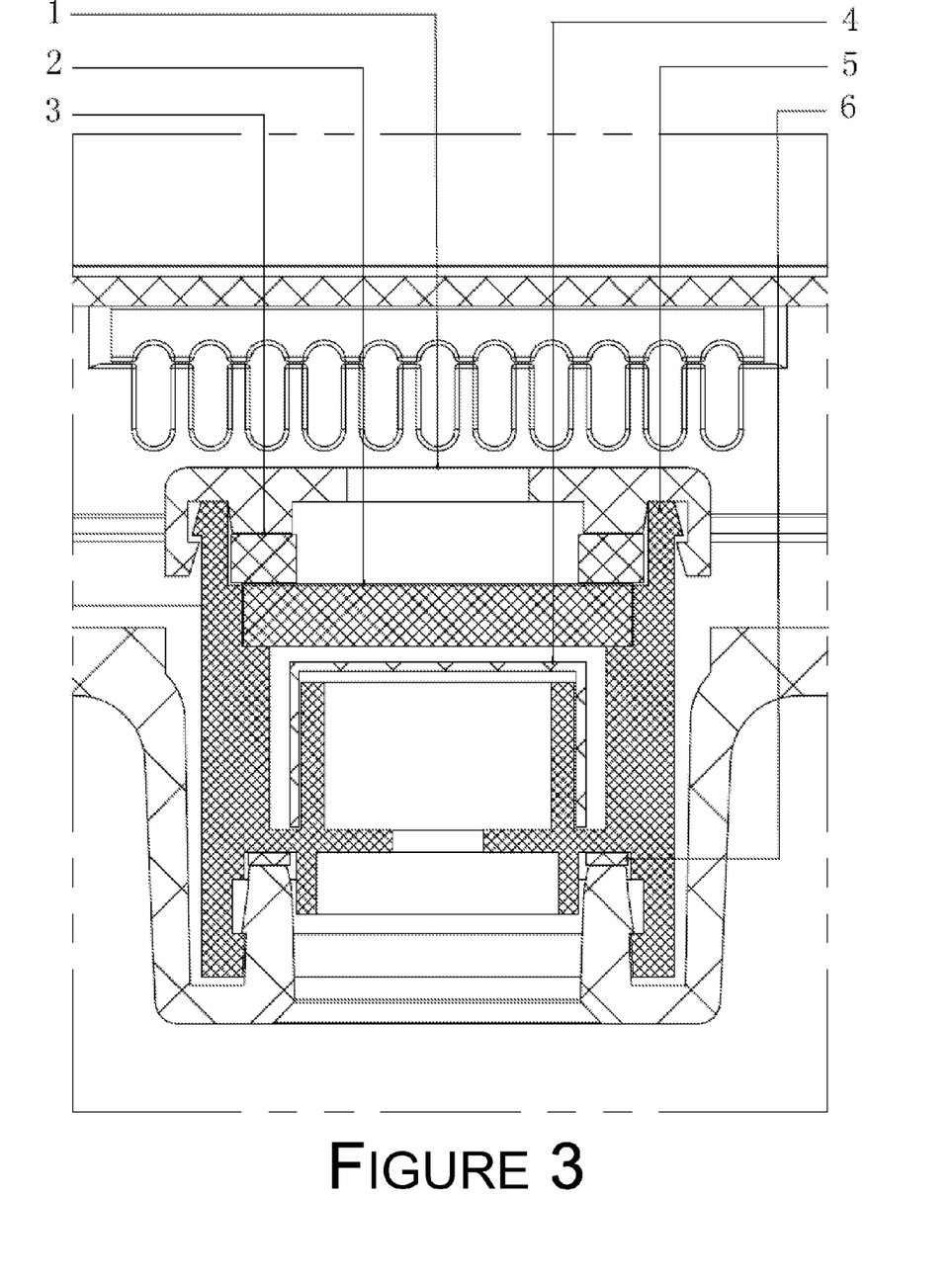
FIG. 3 is an enlarged view of section A of FIG. 1.

Casing 9 contains the battery core therein. As shown in FIG. 2, the battery core comprises a plurality of electrode pieces 11 and a plurality of membranes 12. Electrode pieces 11 include positive-polarity electrode pieces and negative-polarity electrode pieces. Each of the positive-polarity electrode pieces is respectively adjacent to two of the negative-polarity electrode pieces, and vice versa. Each of the membranes 12 is disposed between a respective one of the positive-polarity electrode pieces and a respective one of the negative-polarity electrode pieces. The leads of the positive-polarity electrode pieces and the negative-polarity electrode pieces are on the same side thereof. Electrode pieces 11 and membranes 12 are arranged in an order as described above, bundled together tightly by upper and lower tapes 13, and placed inside casing 9.

Figure 7:
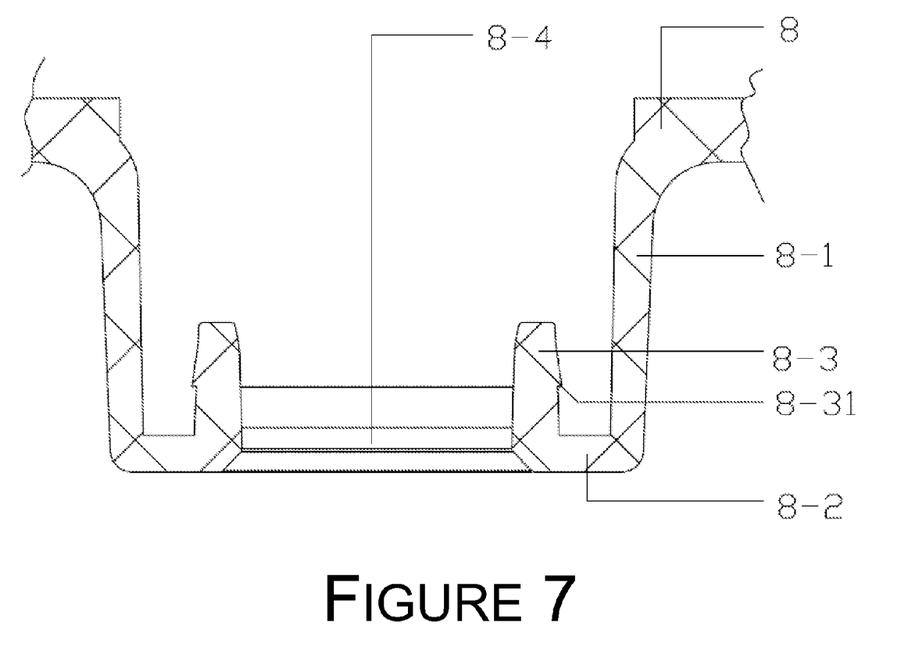
FIG. 7 is a partial view of a structural diagram of a thermal cap of the first embodiment of the present invention.

Referring to FIG. 7, which illustrates a cross-sectional view of thermal cover 8, a middle portion of thermal cover 8 extends downwardly to form a first section 8-1, and extends horizontally towards a middle portion thereof to form a second section 8-2, then extends upwardly to form a third section 8-3. A gap exists between the third section 8-3 and the first section 8-1. A rim 8-31 is formed around an outer circumference of the third section 8-3 with a hook surface facing downward. An inner hollow formed by the third section 8-3 makes a liquid filling hole 8-4.

Figure 5:
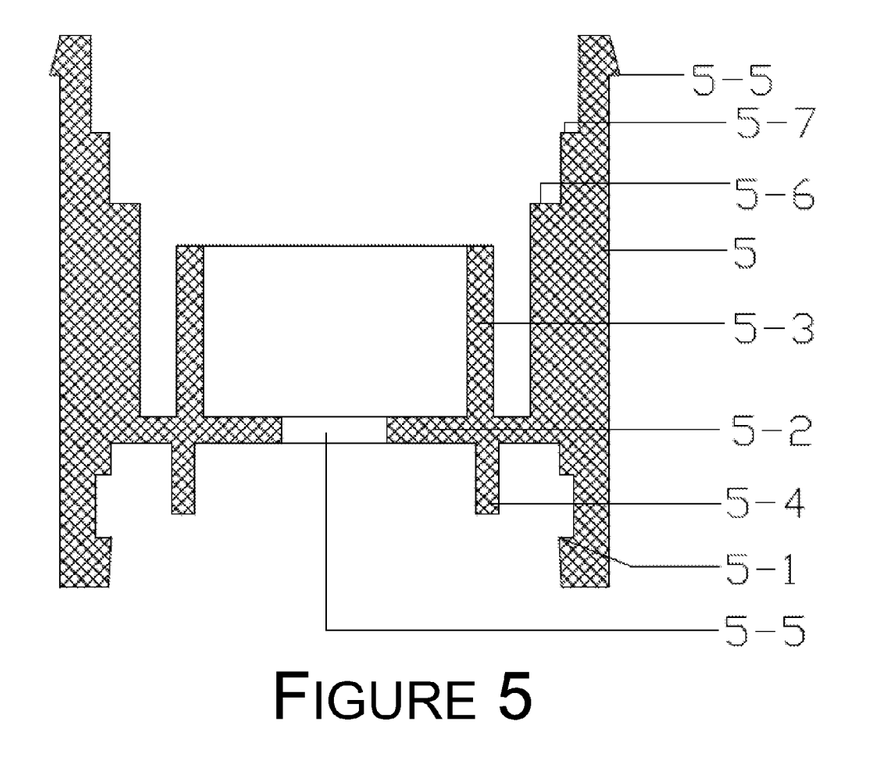
FIG. 5 is a structural diagram of a safety cover of the first embodiment of the present invention.

As shown in FIG. 5, the shape of an outer wall of safety cover 5 is generally cylindrical in shape with a through hole in a middle portion thereof. A rim 5-1 is formed around the lower end of an inner wall of safety cover 5 with a hook surface facing upward. The rim 5-1 and the rim 8-31 of thermal cover 8 correspondingly fit and hook together.

A protruding ring 5-2 extends inwardly around a lower-middle portion of the inner wall of safety cover 5 to form a round hole 5-5. Protruding ring 5-2 has an upwardly protruding upper ring 5-3 and a downwardly protruding lower ring 5-4. A respective gap exists between the upper ring 5-3 and a side wall of thermal cover 5, and between the lower ring 5-4 and the side wall of thermal cover 5. The lower ring 5-4 and the side wall fit around the third section 8-3 of thermal cover 8. The hook surface of the rim 5-1 of safety cover 5 and the hook surface of the rim 8-31 of thermal cover 8 hook together. Gasket 6 is disposed between a top surface of the third section 8-3 and protruding ring 5-2.

Figure 6:
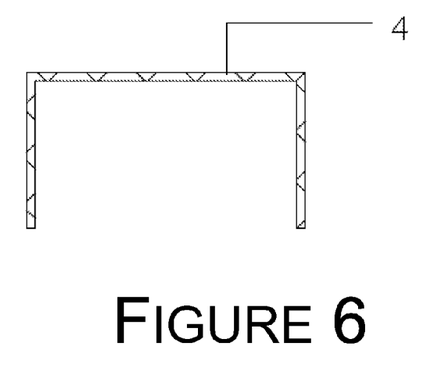
FIG. 6 is a structural diagram of an adjustable pressure cap of the first embodiment of the present invention.

An upper opening of the upper ring 5-3 is sealed by adjustable pressure cap 4, which is shown in FIG. 6. A cross section of adjustable pressure cap 4 forms a concave with an opening pointing downward such that it caps around the upper ring 5-3 fixedly. A portion of adjustable pressure cap 4 that corresponds to the upper ring 5-3 has a plurality of pores thereon (as the diameter of the pores is rather small they are not shown in the figures). In one embodiment, adjustable pressure cap 4 is made of a polyethylene (PE)-based material, due to certain porosity thereof. Variation in porosity corresponds to variation in ventilation pressure. As the diameter of the pores can be adjusted, the pressure withheld by adjustable pressure cap 4 can thus be adjusted. The use of a PE-based material can guarantee that the battery vents gas out but not in. Additionally, as the useful life of the PE-based material can be adjusted by its surface area, the useful shell life can thus be customized to meet different customer demands. Pressure value of the safety vale can be adjusted by adjusting the thickness of adjustable pressure cap 4. Accordingly, the safety valve can be controlled corresponding to different applications of the battery to timely ventilate internally-formed gas out of the battery to thereby enhance safety during operation of the battery.

An upper-middle portion of the inner wall of safety cover 5 has steps 5-6 and 5-7 thereon. Pressure filter 2, affixed on or otherwise engaged with the step 5-6, has a pancake-like shape and an upper surface thereof is flush with the step 5-7. Pressure filter 2 has a plurality of pores (as the diameter of the pores is rather small they are not shown in the figures). In one embodiment, pressure filter 2 is made of a PE-based material, due to certain porosity thereof. Variation in porosity corresponds to variation in ventilation pressure. As the diameter of the pores can be adjusted, the pressure withheld by pressure filter 2 can thus be adjusted. The use of a PE-based material can guarantee that the battery vents gas out but not in. Additionally, as the useful life of the PE-based material can be adjusted by its surface area, the useful shell life can thus be customized to meet different customer demands. Pressure value of the safety vale can be adjusted by adjusting the thickness of pressure filter 2. Accordingly, the safety valve can be controlled corresponding to different applications of the battery to timely ventilate internally-formed gas out of the battery to thereby enhance safety during operation of the battery.

Figure 4:
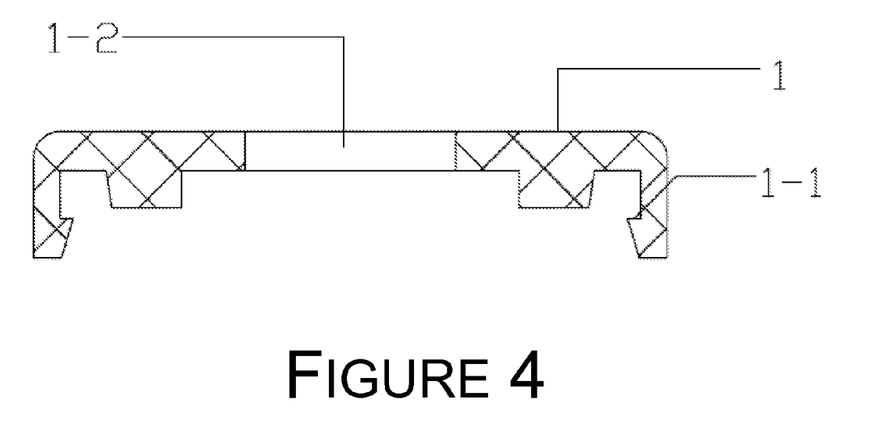
FIG. 4 is a structural diagram of a pressure cap of the first embodiment of the present invention.

A rim 5-5 is formed around the upper end of safety cover 5 with a hook surface facing downward. The upper end of safety cover 5 and pressure cap 1 hook together. FIG. 4 illustrates the structure of pressure cap 1. An outer edge of pressure cap 1 bends downwardly 90 degrees to form a downwardly-bending portion. A rim 1-1 is formed around an inner wall of the downward-bending portion with a hook surface facing upward. The rim 1-1 and the rim 5-5 of safety cover 5 correspondingly fit and hook together. Pressure cap 1 covers an upper opening of safety cover 5 and is hooked thereto, with gasket 3 disposed between pressure cap 1 and the step 5-7 on the inner wall of safety cover 5. A middle portion of pressure cap 1 includes a through hole 1-2.

Transparent cover 7 covers aluminum electrode poles 10 and the safety valve, and snaps onto casing 9. Transparent cover 7 protects components such as the safety valve and aluminum electrode poles 10 from external damage.

During operation of the battery, the safety valve is sprung open when an internal pressure of the battery reaches a certain threshold value to timely ventilate a gas therein to avoid rupture of the battery casing. Safety of the battery is thus enhanced, and reliability of safe operation of the battery during operation is guaranteed.

Second Embodiment

In FIG. 8-15, which pertain to the second embodiment of the present invention, a relationship between numeral references and various components is as follows: 1—O-ring, 2—safety cover, 3—pressure cap, 4—adjustable pressure cap, 5—pressure filter, 6—gasket, 7—transparent cover, 8—polarity distinction cover, 9—hex nut, 10—aluminum cover, 11—plastic cover, 12—electrode pole gasket, 13—aluminum electrode pole, 14—casing, 15—tapes, 16—electrode pieces, 17—membranes.

Figure 8:
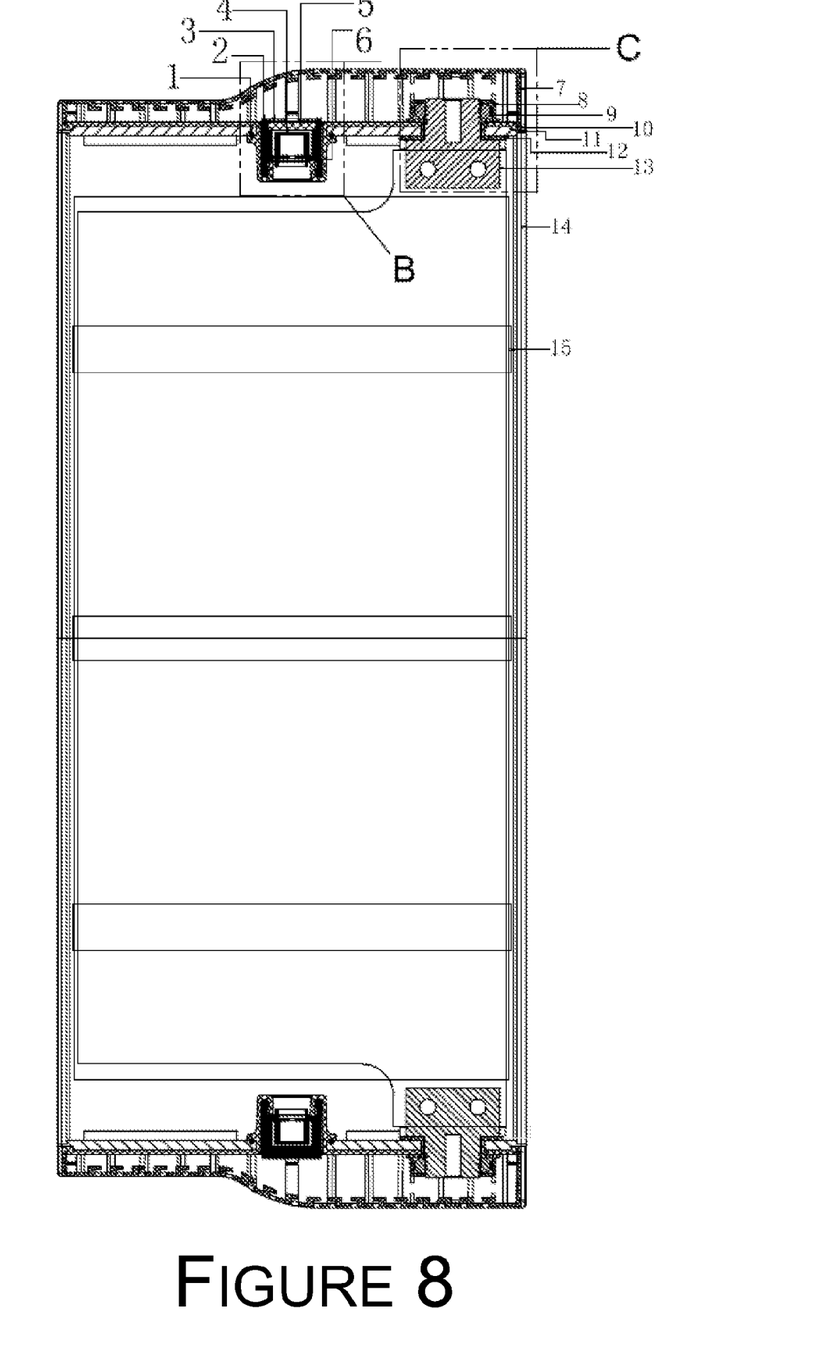
FIG. 8 is a structural diagram of a second embodiment of the present invention.
Figure 9:
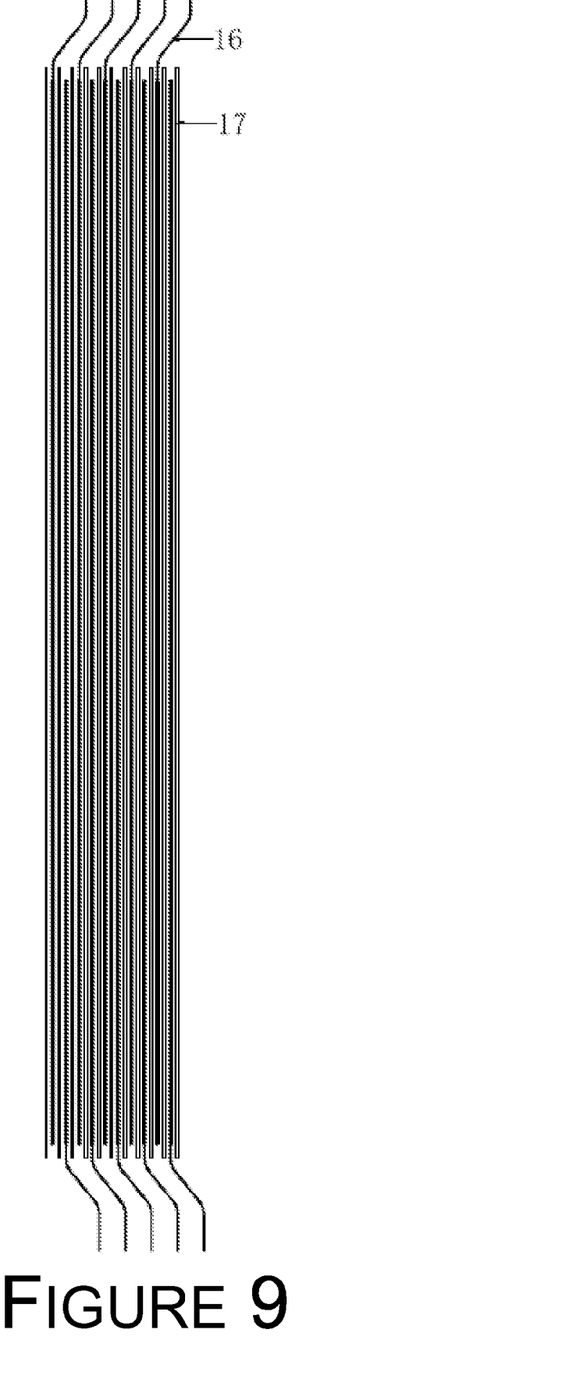
FIG. 9 is a diagram of an arrangement of electrodes and membranes of the second embodiment of the present invention.
Figure 15:
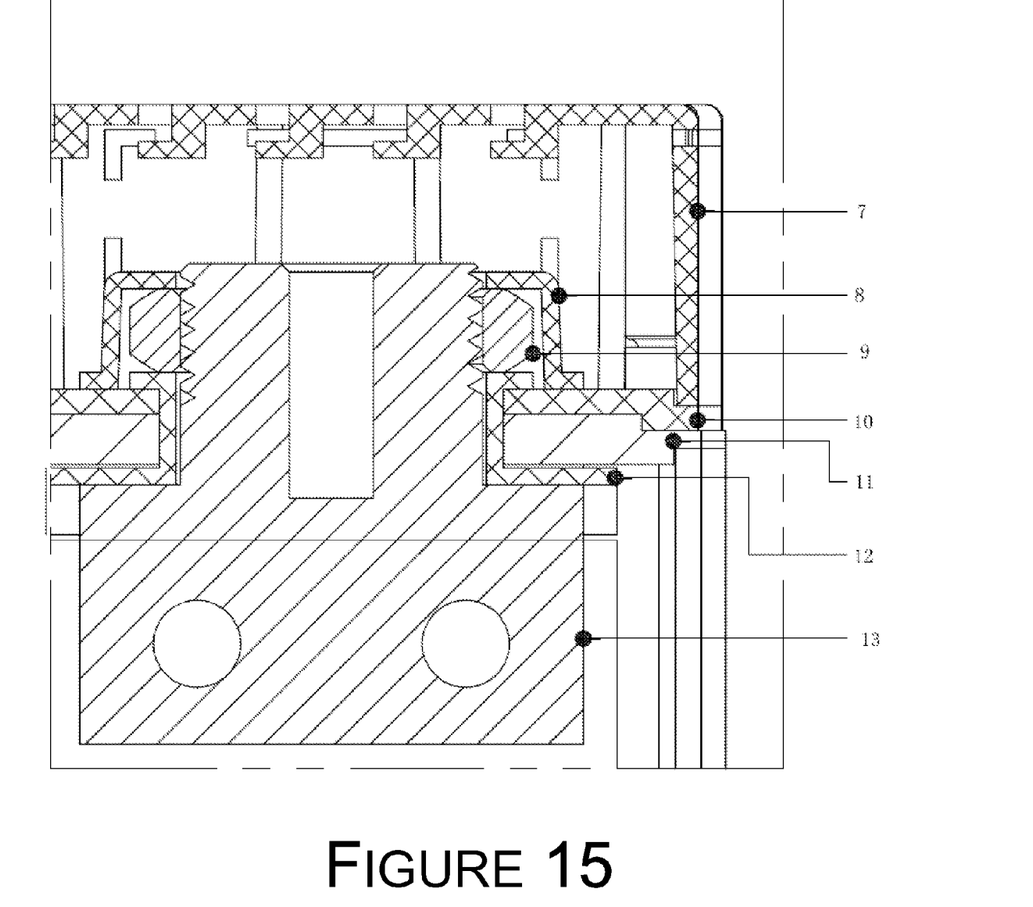
FIG. 15 is an enlarged view of section C of FIG. 8.

The second embodiment comprises a lithium-ion battery with electrode pole exposed on both ends. The battery includes casing 14 and a battery core that is disposed inside casing 14. Casing 14 is generally rectangular in shape, and is made of a plastic material or a metallic material. A plurality of parallel reinforcement ribs are formed on exterior walls on four sides of casing 14 in a horizontal direction. Each of both ends of casing 14 includes a respective opening. As both ends of the battery core are identical, in the interest of brevity the description hereinafter pertains to the structure of one of the ends. Referring to FIGS. 8 and 15, the opening of casing 14 is sealed by plastic cover 11 and aluminum cover 10 with aluminum cover 10 in contact with an outer surface of plastic cover 11. Aluminum electrode pole 13 is disposed next to respective inner walls of aluminum cover 10 and plastic cover 11 near casing 14, with electrode pole gasket 12 disposed between aluminum electrode pole 13 and aluminum cover 10 and plastic cover 11. Hex nut 9 and polarity distinction cover 8, in that order, are screwed onto a portion of aluminum electrode pole 13 that extends outside of aluminum cover 10. Both ends of electrode pole 13 are symmetrically arranged.

Casing 14 contains the battery core therein. As shown in FIG. 2, the battery core comprises a plurality of electrode pieces 16 and a plurality of membranes 17. Electrode pieces 16 include positive-polarity electrode pieces and negative-polarity electrode pieces. Each of the positive-polarity electrode pieces is respectively adjacent to two of the negative-polarity electrode pieces, and vice versa. Each of the membranes 17 is disposed between a respective one of the positive-polarity electrode pieces and a respective one of the negative-polarity electrode pieces. The leads of the positive-polarity electrode pieces and the negative-polarity electrode pieces extend toward a respective one of the ends of casing 14. Electrode pieces 16 and membranes 17 are arranged in an order as described above, bundled together tightly by three tapes 15, and placed inside casing 14.

Figure 10:
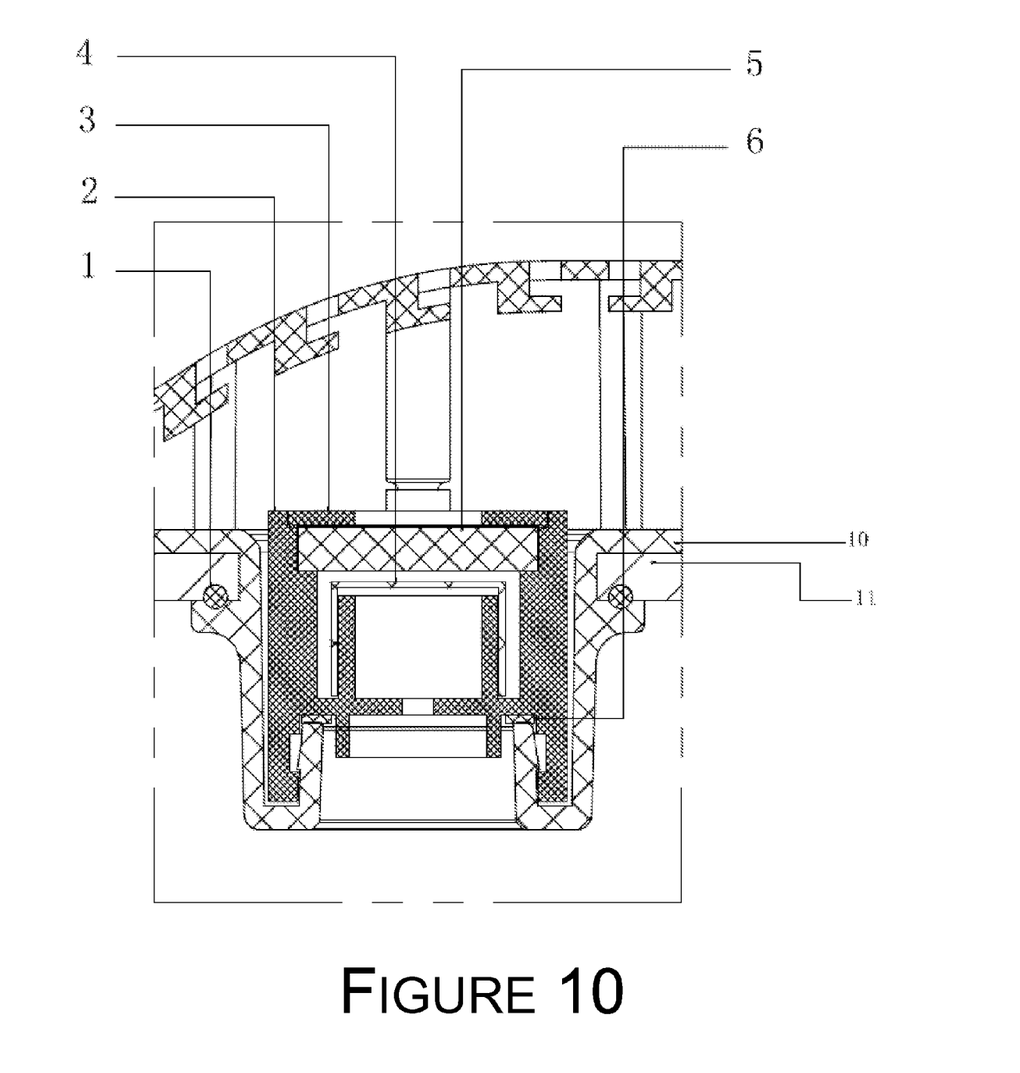
FIG. 10 is an enlarged view of section B of FIG. 8.
Figure 14:
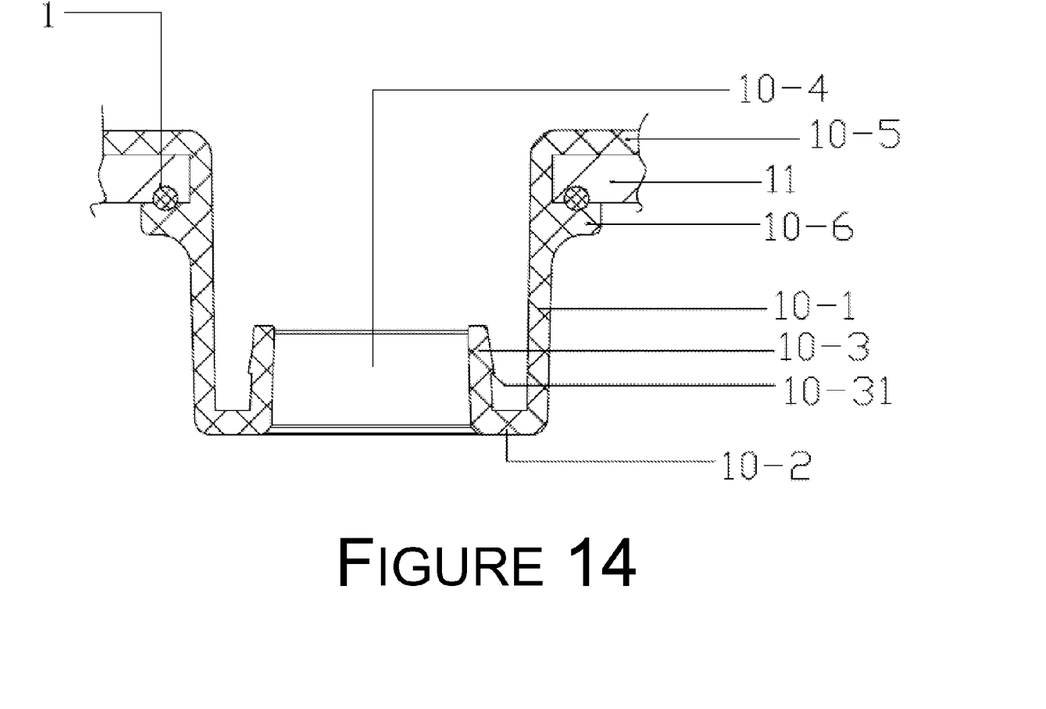
FIG. 14 is a partial view of a structural diagram of an aluminum cover and a plastic cover of the second embodiment of the present invention.

Referring to FIGS. 8, 10 and 14, a middle portion of plastic cover 11 includes an opening. According to a cross section of aluminum cover 10, a middle portion of aluminum cover 10 extends downwardly along the opening of plastic cover 11 to form a first section 10-1, and extends horizontally towards a middle portion thereof to form a second section 10-2, then extends upwardly to form a third section 10-3. A gap exists between the third section 10-3 and the first section 10-1. A rim 10-31 is formed around an outer circumference of the third section 10-3 with a hook surface facing downward. An inner hollow formed by the third section 10-3 makes a liquid filling hole 10-4. An edge of the opening of plastic cover 11 is sandwiched between an upper portion 10-5 and a protruding ring 10-6 of aluminum cover 10, with O-ring 1 disposed between plastic cover 11 and the protruding ring 10-6.

Figure 12:
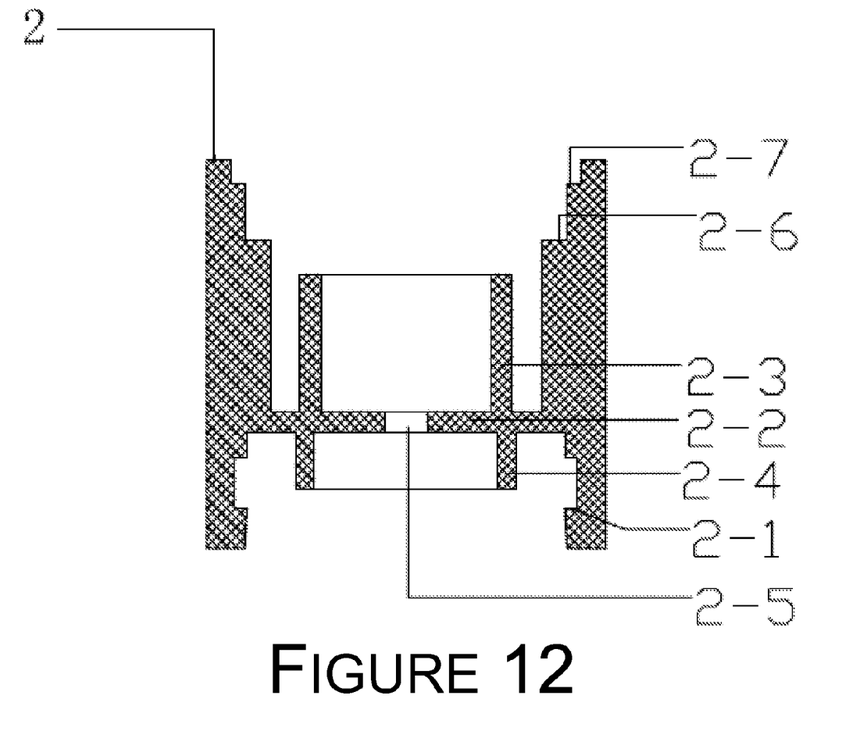
FIG. 12 is a structural diagram of a safety cover of the second embodiment of the present invention.

Referring to FIG. 12, the shape of an outer wall of safety cover 2 is generally cylindrical in shape with a through hole in a middle portion thereof. A rim 2-1 is formed around the lower end of an inner wall of safety cover 2 with a hook surface facing upward. The rim 2-1 and the rim 10-31 of aluminum cover 10 correspondingly fit and hook together.

A protruding ring 2-2 extends inwardly around a lower-middle portion of the inner wall of safety cover 2 to form a round hole 2-5. Protruding ring 2-2 has an upwardly protruding upper ring 2-3 and a downwardly protruding lower ring 2-4. A respective gap exists between the upper ring 2-3 and a sidewall of safety cover 2 and between the lower ring 2-4 and the side wall of safety cover 2. The lower ring 5-4 and the side wall of safety cover 2 fit around the third section 10-3 of aluminum cover 10. The rim 2-1 of safety cover 2 and the rim 10-31 of aluminum cover 10 hook together. Gasket 6 is disposed between a top surface of the third section 10-3 and protruding ring 2-2.

Figure 13:
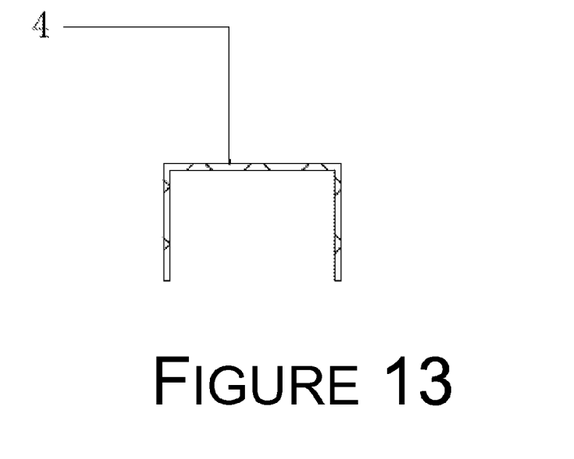
FIG. 13 is a structural diagram of an adjustable pressure cap of the second embodiment of the present invention.

An upper opening of the upper ring 2-3 is sealed by adjustable pressure cap 4, which is shown in FIG. 13. A cross section of adjustable pressure cap 4 forms a concave with an opening pointing downward such that it caps around the upper ring 2-3 fixedly. The opening of adjustable pressure cap 4 that corresponds to the upper ring 2-3 has a plurality of pores thereon (as the diameter of the pores is rather small they are not shown in the figures). In one embodiment, adjustable pressure cap 4 is made of a polyethylene (PE)-based material, due to certain porosity thereof. Variation in porosity corresponds to variation in ventilation pressure. As the diameter of the pores can be adjusted, the pressure withheld by adjustable pressure cap 4 can thus be adjusted. The use of a PE-based material can guarantee that the battery vents gas out but not in. Additionally, as the useful life of the PE-based material can be adjusted by its surface area, the useful shell life can thus be customized to meet different customer demands. Pressure value of the safety vale can be adjusted by adjusting the thickness of adjustable pressure cap 4. Accordingly, the safety valve can be controlled corresponding to different applications of the battery to timely ventilate internally-formed gas out of the battery to thereby enhance safety during operation of the battery.

An upper-middle portion of the inner wall of safety cover 2 has steps 2-6 and 2-7 thereon. Pressure filter 5, affixed on or otherwise engaged with the step 2-6, has a pancake-like shape and an upper surface thereof is flush with the step 2-7. Pressure filter 5 has a plurality of pores (as the diameter of the pores is rather small they are not shown in the figures). In one embodiment, pressure filter 5 is made of a PE-based material, due to certain porosity thereof. Variation in porosity corresponds to variation in ventilation pressure. As the diameter of the pores can be adjusted, the pressure withheld by pressure filter 5 can thus be adjusted. The use of a PE-based material can guarantee that the battery vents gas out but not in. Additionally, as the useful life of the PE-based material can be adjusted by its surface area, the useful shell life can thus be customized to meet different customer demands. Pressure value of the safety vale can be adjusted by adjusting the thickness of pressure filter 5. Accordingly, the safety valve can be controlled corresponding to different applications of the battery to timely ventilate internally-formed gas out of the battery to thereby enhance safety during operation of the battery.

Figure 11:
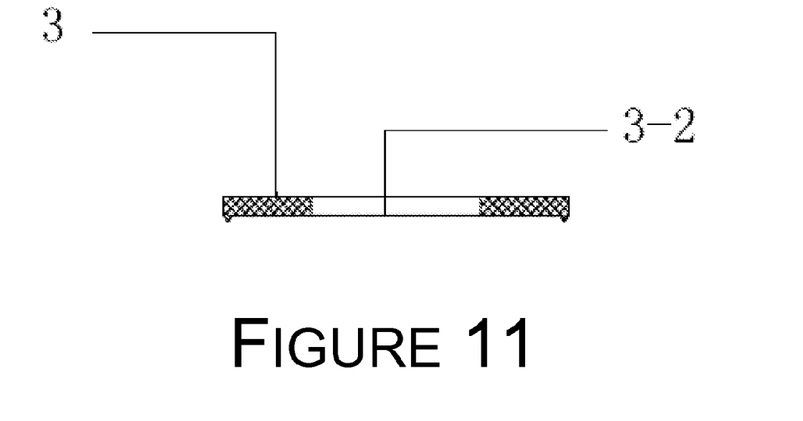
FIG. 11 is a structural diagram of a pressure cap of the second embodiment of the present invention.

FIG. 11 illustrates the structure of pressure cap 3. A middle portion of pressure cap 3 includes a through hole 3-2. A lower surface of pressure cap 3 has an annular rib thereon with a triangular cross section. Correspondingly, the step 2-7 of safety cover 2 forms an annular groove with a triangular cross section. When pressure cap 3 is mounted on the step 2-7, the annular rib on pressure cap 3 mates with and is received in the annular groove of the step 2-7.

Transparent cover 7 covers aluminum electrode pole 13 and the safety valve, and snaps onto casing 14. Transparent cover 7 protects components such as the safety valve and aluminum electrode pole 13 from external damage.

During operation of the battery, the safety valve is sprung open when an internal pressure of the battery reaches a certain threshold value to timely ventilate a gas therein to avoid rupture of the battery casing. Safety of the battery is thus enhanced, and reliability of safe operation of the battery during operation is guaranteed.

The above description pertains to preferred embodiments of the present invention, based on the concept of which those of ordinary skill in the art may derive variations thereof in actual implementation and range of applications. Such variations are deemed within the scope of protection of the present invention. In summary, content of the specification shall not be interpreted to limit the scope of protection of the present invention.

What is claimed is:

1. A lithium-ion battery with a gas-releasing and explosion-proof safety valve, the battery comprising:
   a casing that includes an opening;
   a battery core disposed inside the casing;
   a thermal cover that seals the opening of the casing; and
   a safety valve disposed on the thermal cover, the safety valve comprising:
      a safety cover, a middle portion of the safety cover having a through hole therein, the safety cover and the thermal cover are hooked together;
      a pressure filter affixed on the middle portion of the safety cover and having a plurality of first pores; and
      an adjustable pressure cap disposed between the safety cover and the pressure filter, the adjustable pressure cap having a plurality of second pores, wherein:
      the safety cover includes a protruding ring that extends inwardly around a lower-middle portion of an inner wall of the safety cover to form a round hole, the protruding ring having an upwardly protruding inner upper ring and a downwardly protruding inner lower ring;
      the safety cover further includes an outer upper ring and an outer lower ring, the outer upper ring concentrically surrounding the inner upper ring, the outer lower ring concentrically surrounding the inner lower ring;
      a gap exists between the inner upper ring and the outer upper ring of the safety cover;
      a gap exists between the inner lower ring and the outer lower ring of the safety cover;
      an inner wall of the outer lower ring of the safety cover has a hook surface;
      with respect to a cross section of the thermal cover, a middle portion of the thermal cover extends towards an inside of the casing to form a first section, and extends horizontally towards a middle portion thereof to form a second section, then extends upwardly to form a third section;
      a gap exists between the third section and the first section of the thermal cover to accommodate the outer lower ring of the safety cover such that the outer lower ring of the safety cover fits around the third section of the thermal cover with the third section of the thermal cover accommodated in the gap between the inner lower ring and the outer lower ring of the safety cover;
      a rim is formed around an outer circumference of the third section with a hook surface facing downward such that the hook surface of the rim around the third section of the thermal cover and the hook surface of the hook surface on the inner wall of the lower ring of the safety cover hook together; and
      a rim of the adjustable pressure cap fits around the inner upper ring of the safety cover and is accommodated in the gap between the inner upper ring and the outer upper ring of the safety cover.

2. A lithium-ion battery with a gas-releasing and explosion-proof safety valve as recited in claim 1, further comprising:
   a gasket, wherein:
      the gasket is disposed between a top surface of the third section of the thermal cover and the protruding ring of the safety cover; and
   a first pressure cap disposed on an upper opening of the inner upper ring, a middle portion of the first pressure cap including a through hole.

3. A lithium-ion battery with a gas-releasing and explosion-proof safety valve as recited in claim 1, wherein:
   an upper-middle portion of an inner wall of the safety cover includes a step thereon; and
   the pressure filter is affixed on or otherwise engaged with the step.

4. A lithium-ion battery with a gas-releasing and explosion-proof safety valve as recited in claim 3, further comprising:
   a first pressure cap that includes a through hole in a middle portion thereof; and
   a gasket, wherein:
      the safety cover includes a rim around an upper end of the safety cover with a second hook surface facing downward;
      an outer edge of the first pressure cap bends downwardly to form a downwardly-bending portion with a rim formed around an inner wall of the downwardly-bending portion having a first hook surface facing upward;
      the first hook surface of the first pressure cap and the second hook surface of the safety cover hook together;
      the first pressure cap covers an upper opening of the safety cover and is hooked thereto;
      the inner wall of the safety cover includes a second step thereon; and
      the gasket is disposed between the first pressure cap and the second step on the inner wall of the safety cover.

5. A lithium-ion battery with a gas-releasing and explosion-proof safety valve as recited in claim 1, wherein the casing has a generally rectangular shape.

6. A lithium-ion battery with a gas-releasing and explosion-proof safety valve as recited in claim 1, wherein the casing includes a first opening and a second opening opposite to the first opening.

7. A lithium-ion battery with a gas-releasing and explosion-proof safety valve as recited in claim 6, wherein the thermal cover comprises an aluminum cover.

8. A lithium-ion battery with a gas-releasing and explosion-proof safety valve as recited in claim 7, further comprising:
a plastic cover is disposed on an opening of the casing, an outer surface of the plastic cover and the aluminum cover are in contact.

9. A lithium-ion battery with a gas-releasing and explosion-proof safety valve as recited in claim 7, further comprising:
an O-ring disposed between the plastic cover and the aluminum cover.

10. A lithium-ion battery with a gas-releasing and explosion-proof safety valve as recited in claim 8, further comprising:
an aluminum electrode pole disposed next to respective inner walls of the plastic cover and the aluminum cover near the casing; and
an electrode pole gasket disposed between the aluminum electrode pole and the plastic cover and the aluminum cover.

11. A lithium-ion battery with a gas-releasing and explosion-proof safety valve as recited in claim 10, further comprising:
a hex nut; and
a polarity distinction cover,
wherein the hex nut and the polarity distinction cover, in an order, are screwed onto a portion of the aluminum electrode pole that extends outside of the aluminum cover.

12. A lithium-ion battery with a gas-releasing and explosion-proof safety valve as recited in claim 10, further comprising:
a first pressure cap that includes a through hole in a middle portion thereof, wherein:
a lower surface of the first pressure cap has an annular rib thereon with a triangular cross section;
an inner wall of the safety cover includes a second step thereon;
the second step of the safety cover forms an annular groove with a triangular cross section; and
when the first pressure cap is mounted on the second step of the safety cover, the annular rib on the first pressure cap mates with and is received in the annular groove of the second step.

13. A lithium-ion battery with a gas-releasing and explosion-proof safety valve as recited in claim 1, wherein exterior walls on four sides of the casing include a plurality of parallel reinforcement ribs in a horizontal direction.

14. A lithium-ion battery with a gas-releasing and explosion-proof safety valve as recited in claim 1, further comprising:
a transparent cover that covers an opening of the casing.

15. A lithium-ion battery with a gas-releasing and explosion-proof safety valve as recited in claim 14, wherein the transparent cover snaps onto the casing.

16. A lithium-ion battery with a gas-releasing and explosion-proof safety valve as recited in claim 1, wherein the casing is made of a plastic material or a metallic material.

17. A lithium-ion battery with a gas-releasing and explosion-proof safety valve as recited in claim 1, wherein the adjustable pressure cap is shaped to form a concave with an opening of the concave pointing toward the protruded ring such that the adjustable pressure cap fits around the inner upper ring of the safety cover.

18. A lithium-ion battery with a gas-releasing and explosion-proof safety valve as recited in claim 17, wherein the adjustable pressure cap is made of a polyethylene-based material.

\* \* \* \* \*

UNITED STATES PATENT AND TRADEMARK OFFICE
CERTIFICATE OF CORRECTION

PATENT NO. : 8,980,455 B2  
APPLICATION NO. : 13/578991  
DATED : March 17, 2015  
INVENTOR(S) : Zhi Guo

Page 1 of 1

It is certified that error appears in the above-identified patent and that said Letters Patent is hereby corrected as shown below:

On the Title page, replace the Item (75) with Item (76).

On the Title page, Item (73), please delete "Zhejiang University (Hangzhou, Zhejiang Province, CN)".

Signed and Sealed this  
Fifth Day of April, 2016

Michelle K. Lee  
*Director of the United States Patent and Trademark Office*